Aug. 17, 1943.  W. RODDER ET AL  2,327,318
WELDING MILL
Filed May 15, 1940  3 Sheets-Sheet 1

INVENTORS
WILLIAM RODDER
& JAMES H. HOPKINS
Richey & Watts
ATTORNEYS

Patented Aug. 17, 1943

2,327,318

UNITED STATES PATENT OFFICE 2,327,318

WELDING MILL

William Rodder, Youngstown, and James H. Hopkins, Alliance, Ohio, assignors of one-half to The Aetna Standard Engineering Company, Youngstown, Ohio, a corporation of Ohio, and one-half to S. F. Keener, doing business as Salem Engineering Company, Salem, Ohio Application May 15, 1940, Serial No. 335,318

3 Claims. (Cl. 78—87)

This invention relates to the manufacture of pipe or tube and more particularly to an improved continuous butt weld pipe mill.

Pipe is manufactured continuously by passing strip metal through an elongated heating furnace to raise the temperature of the entire strip almost up to welding heat, forming the strip into open seam tubular form as it leaves the furnace, discharging a blast of air against the edges of the open seam to raise the temperature thereof to welding heat, and then immediately passing the partially formed tube through a pair of welding rolls which cause the edges of the seam to abut and become welded together.

In this type of pipe or tube welding the strip may travel as fast as 300 feet per minute or more and, in view of such high speeds, all of the factors entering into the making of the weld must be very accurately controlled and correlated. The proper distances from the furnace outlet to the forming rolls and from the center line of the forming rolls to the center line of the welding rolls are particularly critical and may vary for different sizes of tube or material being welded.

It is among the objects of our present invention to provide an improved continuous butt welding pipe mill which can readily be adapted to manufacturing a large range of pipe sizes. Other objects include: the provision of independently adjustable roll supporting and driving mechanism for the rolls of a continuous butt weld mill whereby the rolls of a pair can be adjusted relative to each other and the sets of rolls can be moved closer together or farther apart as necessary to achieve the best welding results for any particular size of pipe; the provision of a butt welding pipe mill which includes means for sizing the pipe immediately after welding; the provision of simple and effective roll supporting and driving mechanisms arranged to be supported on a movable base structure and to have a large range of relative adjustments; the provision of a butt weld pipe mill having a plurality of pairs of rolls each pair being individually driven and independently adjustable relative to the other pairs of rolls; and the provision of improved means for both independently and simultaneously controlling the speed of the pairs of rolls of the mill.

The above and other objects of our invention will appear from the following description of one embodiment thereof, reference being had to the accompanying drawings, in which—

Figure 2:
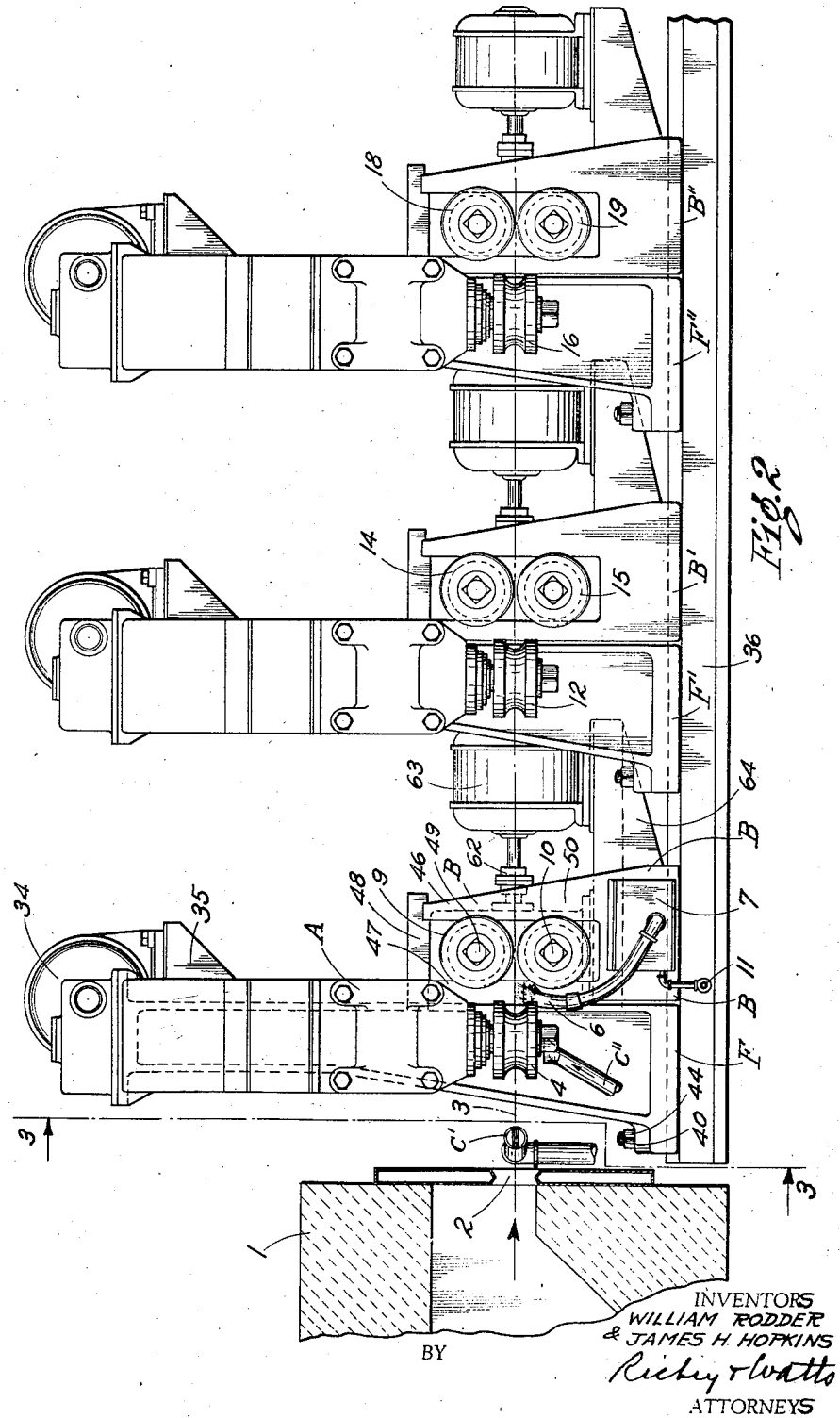
Figure 2 is a side elevation of the mill shown in Figure 1.
Figure 3:
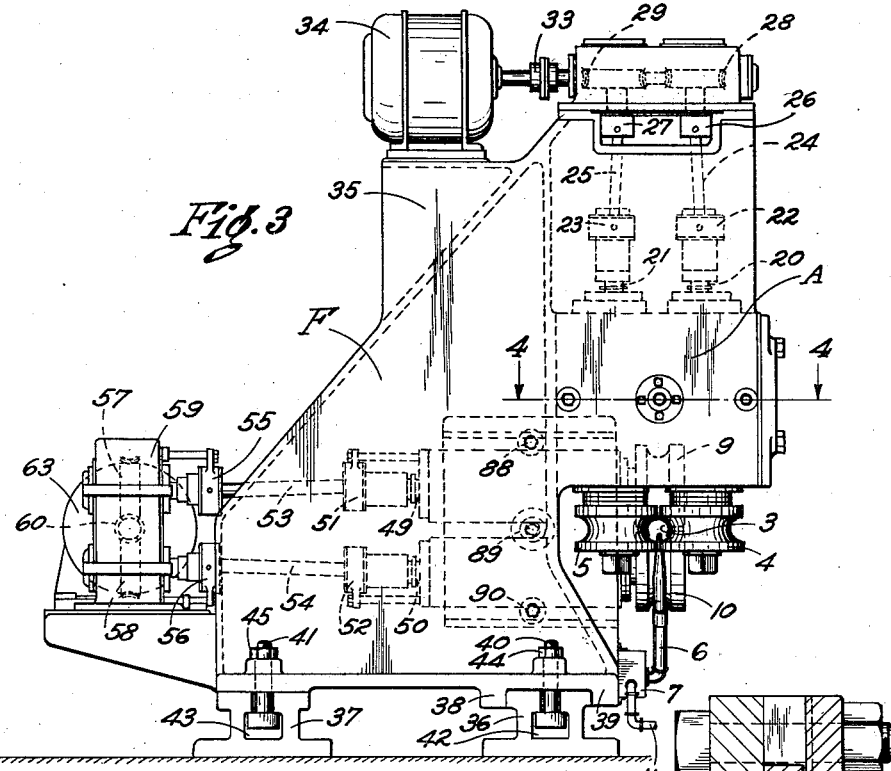
Figure 3 is an end view of the mill shown in Figures 1 and 2 taken substantially on line 3—3 of Figure 2.

The exit end of the heating furnace 1 is provided with a suitable slot 2 through which the heated strip 3 passes. A pair of oppositely disposed blow pipes C and C' are positioned adjacent the outlet 2 and discharge air under pressure from any suitable source (not shown) against the edges of the advancing strip. A third blow pipe C'' is seen in Figure 2 and discharges air against the edges of the strip after they have begun to be formed by the forming rolls 4 and 5. The purpose of these blow pipes is to bring the edges of the tube up to welding temperature. Before the strip has a chance to cool materially it enters the pair of vertical forming rolls 4 and 5 which, as is seen in Figure 3, form the strip into generally tubular shape but with the edges spaced apart a substantial distance. An air discharge horn and seam guide 6 connects to an air box 7 which is carried by the frame or base B of the pair of horizontal welding rolls 9 and 10. Air is conducted to the box 7 from any suitable source of supply through the pipe 11.

The upper end of the seam guide horn 6 is provided with openings to discharge air into the pipe to blow out any scale which may be present. The horn 6 extends up into the open seam of the pipe and acts as a seam guide to prevent weaving and collapsing of the pipe as it enters the welding rolls. After leaving the horn 6 the pipe immediately passes through the welding rolls 9 and 10 which close the tube and cause welding pressure to be exerted between the edges to form the weld. After leaving the welding rolls the tube passes through vertical sizing and finishing rolls 12 and 13 and horizontal rolls 14 and 15. In the arrangement shown additional vertical sizing and finishing rolls are provided at 16 and 17 and horizontal rolls at 18 and 19. As the heated strip passes through the above described pairs of rolls it is formed, welded, sized and finished to a certain degree.

Each pair of vertical rolls is mounted on a separate base with a seperate drive motor therefor and each pair of horizontal rolls is similarly mounted on its own base structure with its own drive motor. As the supporting and driving arrangements for the vertical forming rolls 4 and 5 are the same as for the pairs of vertical rolls 12—13 and 16—17, only the structure supporting and driving the forming rolls 4 and 5 will be described in detail and it will be understood that the others are substantially the same. Likewise, the support and drive arrangement for the welding rolls 9 and 10 is the same as that for the pairs of rolls 14—15 and 18—19 and reference will be made particularly only to rolls 9 and 10.

Rolls 4 and 5 are mounted on vertical shafts 20 and 21 respectively which extend up through the adjusting section A of the supporting frame F and are connected by universal joints 22 and 23 to intermediate shafts 24 and 25 which are connected by a second set of universal joints, indicated at 26 and 27, to the shafts of worm gears 28 and 29. These worm gears are driven by the worms 30 and 31 on the shaft 32, it being noted that the worms 30 and 31 are of opposite hand in order to drive the rolls 4 and 5 in opposite directions.

The shaft 32 has suitable bearings in the upper portion of the frame F and is connected by a coupling 33 to the drive motor 34 which is mounted on a pedestal 35 supported by the frame or base F. The bottom of the base F is substantially rectangular in form and is slidably supported on the heavy slotted rail or track members 36 and 37. Downwardly extending flanges 38 and 39 engage the sides of the head of the rail 36 and prevent movement of the frame F and the parts carried thereby laterally of the supporting rails. Clamp bolts 40 and 41 have their heads disposed in the enlarged openings 42 and 43 of the rails and nuts 44 and 45, when tightened, firmly lock the frame F in position on the rails. It will be understood that by loosening the nuts 44 and 45 the frame F can be moved lengthwise on the rails toward or away from the furnace outlet 2 and thus the distance between the furnace outlet and the forming rolls 4 and 5 can be accurately adjusted.

The frame or base B for the welding rolls 9 and 10 includes spaced upwardly projecting arms 46 and 47, connected at their upper ends by a member 48, thus forming a guideway for the sliding blocks which carry the shafts 49 and 50 of the rolls 9 and 10. These shafts 49 and 50 are adapted to be adjusted toward and away from each other in the same manner as the rolls 4 and 5. The adjusting mechanism is shown in Figure 4 and will be described in detail later.

As is best seen in Figure 3 the inner ends of shafts 49 and 50 are connected through universal joints 51 and 52 to the intermediate shafts 53 and 54 which in turn are connected through universal joints indicated at 55 and 56 to the shafts of the worm gears 57 and 58 in the gear box 59. A worm 60 is mounted in the gear box 59 between the worm gears 57 and 58 and engages both of them, thus driving them in opposite directions, and a coupling 62 connects the shaft 61 to the driving motor 63.

Figure 1:
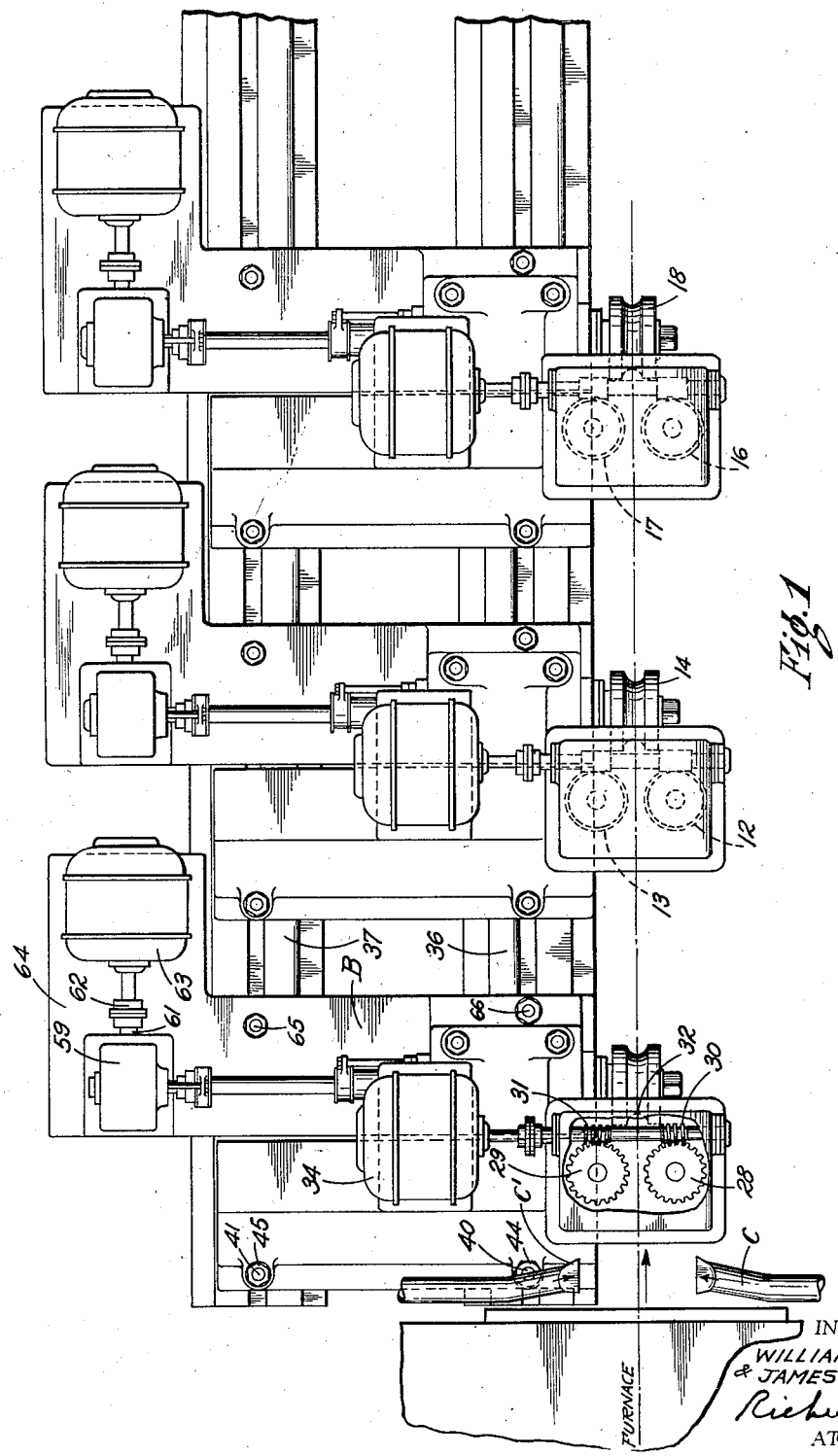
Figure 1 is a plan view of our welding mill showing the end of the heating furnace, the forming and welding rolls, and the sizing and finishing rolls.

As is best seen in Figure 1, the base B is generally L-shaped and the platform 64 extends beyond the track 37 and supports the gear box 59 and motor 63. The tracks 36 and 37 support the base B in the same manner as they support the base or frame F and clamp bolts 65 and 66 serve to secure the base B to the tracks in any desired adjusted position. Our arrangement of roll supporting bases F and B, independently mounted on the tracks 36 and 37, makes it possible to vary the spacing between the pairs of rolls 4—5 and 9—10. As shown in the drawings, the base B has been moved up quite close to the base F, but it will be understood that, by moving the base B away from the base F, the center to center spacing between the forming and welding rolls can be increased. The pair of vertical rolls 12—13 are mounted on a base F', rolls 14—15 on a base B', rolls 16—17 on a base F'' and rolls 18—19 on a base B'', it being understood that the motor and drive connections for each of these sets of sizing and finishing rolls are substantially the same as those already described.

Figure 4:
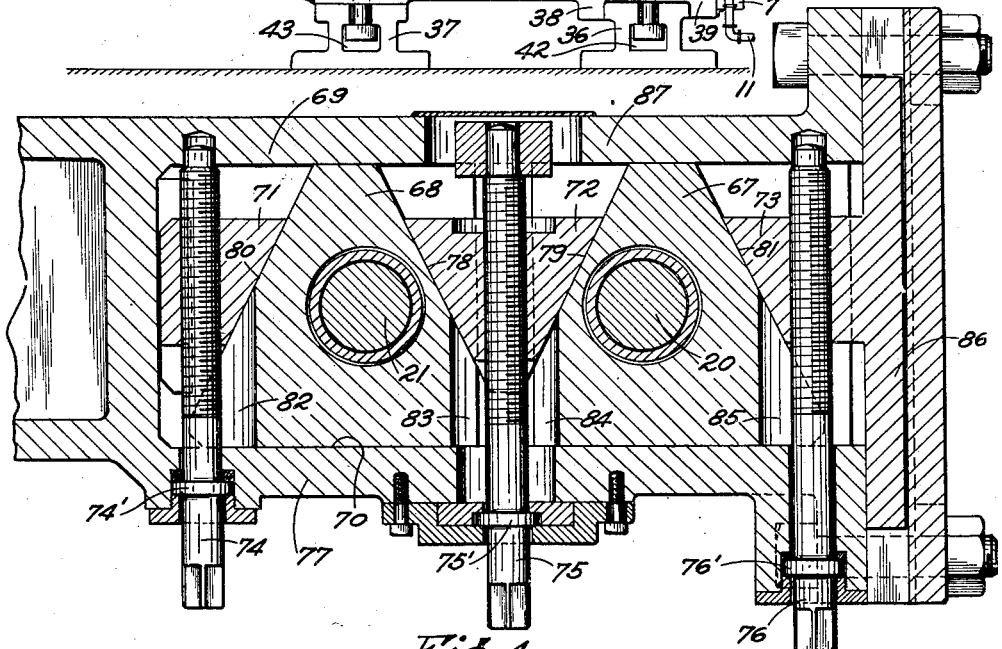
Figure 4 is an enlarged fragmentary horizontal cross-sectional view taken on line 4—4 of Figure 3 and illustrating the mechanism for adjusting the center to center spacing of a pair of rolls.

In order to adjust the center to center spacing between the rolls 4 and 5 and their shafts 20 and 21 we provide the mechanism shown in Figure 4 and similar apparatus, arranged horizontally instead of vertically, is provided for adjusting the spacing between the rolls 9 and 10 and their shafts 49 and 50. Referring to Figures 3 and 4, the shafts 20 and 21 are supported at their ends in suitable bearings carried by the triangularly shaped blocks 67 and 68 which have flattened parallel side faces in sliding engagement with the inner surfaces 69 and 70 of the walls 87 and 77 of the adjustment section housing A. Movement of these blocks 67 and 68 toward or away from each other is effected by the three wedge members 71, 72 and 73 which have threaded engagement with the adjusting screws 74, 75 and 76 respectively. These screws are supported in the housing A in such a manner that they may be rotated but are restrained from axial movement.

The flanges 74', 75' and 76' on the screw shafts 74, 75 and 76, are disposed between members which are carried by the front wall 77 of the adjustment section A in such a manner that the shafts may rotate but not move axially. The center adjusting wedge 72 has oppositely slanting faces 78 and 79 which engage correspondingly sloping faces of the blocks 67 and 68. In like manner, the wedge members 71 and 73 have sloping faces 80 and 81 respectively which engage the outer surfaces of the blocks 67 and 68. Grooves 82 and 83 are formed in block 68 and similar grooves 84 and 85 in block 67. These grooves are disposed in alignment with the adjusting screws 74, 75 and 76 and provide clearance for these screws regardless of the position of the blocks 67 and 68. Wedge 73 is carried by a sliding base member 86 which guides the wedge while permitting it to move axially of the screw 76, and wedge 71 is also guided in housing A to maintain parallelism with shaft 21.

Assuming that it is desired to move the shafts 20 and 21, and the rolls 4 and 5 carried thereby, closer together than the position shown in Figure 4, it is only necessary for the operator to rotate the screw 75 to move the center wedge 72 toward the rear wall 87 of the adjusting section A. This will establish clearance between the tapered surfaces 78 and 79 of the wedge and the corresponding surfaces of the blocks 67 and 68. Next the operator rotates the screws 74 and 76 to move the wedges 71 and 73 toward the front wall 77. This movement will cause the blocks 67 and 68 to be moved inwardly toward each other until they again engage the faces 78 and 79 of the center wedge 72. The screws 74 and 76 may be tightened to firmly lock the blocks 67 and 68 in their new positions.

To move the blocks 67-68 and shafts 20 and 21 apart the above described operation is reversed, the shafts 74 and 76 first being rotated to move the wedges 71 and 73 toward the rear wall 87 and the center screws 75 then being turned to move the center wedge 72 toward the front wall 77, forcing the blocks 67 and 68 apart into the new position. The universal joint connections between the shafts 20 and 21 and their intermediate drive shafts 24 and 25 permit this lateral adjustment to take place, if desired, while the shafts and rolls are being driven and thus we have provided an extremely simple and effective means for exactly regulating the roll spacing.

The same arrangement of parts, except arranged horizontally, is employed to adjust the rolls 9 and 10 and the ends of the adjusting screws for the horizontal rolls are indicated at 88, 89 and 90 in Figure 3.

The individual motors which drive the pairs of rolls making up our mill are all connected with individual field rheostats or other suitable speed varying apparatus, to the generator of a motor generator set. By varying the voltage output of the motor generator set the speeds of all the drive motors may be simultaneously and uniformly increased or decreased. Furthermore, by adjusting the individual motor speed adjusting devices, the speed of any one motor may be increased or decreased relative to the speeds of the other motors and thus an exceedingly flexible control arrangement is provided whereby the speed of each individual set of rolls may be set at the desired value relative to the speeds of the other sets of rolls. For example, it may under some circumstances be desired to cause the rolls 16—17 and 18—19 to rotate faster than the rolls 14—15 and 12—13 in order to impose a tension on the strip or tube and this can be accomplished in any desired degree by the individual motor speed adjustment. By means of the overall mill speed adjustment, obtained by varying the generator output, it is possible to vary the speed of all the rolls of the entire mill as a unit to obtain the best possible forming and welding conditions for the size and type of material being handled and the degree of heat imparted thereto by the furnace.

Our individual, slidably mounted base supports for the rolls making up our mill permit the necessary adjustment of the distances between pairs of rolls to produce the best welding conditions for different sizes of pipe and, this feature, coupled with our improved control system, provides a universal, flexible mill adapted to weld a wide range of pipe sizes and materials.

Although we have described the illustrated embodiment of our invention in considerable detail it will be understood that variations and modifications may be made in the form of the apparatus employed without departing from the spirit of our invention. We do not therefore, wish to be limited to the exact structures and arrangement of parts herein shown and described, but claim as our invention all forms thereof coming within the scope of the appended claims.

We claim:
1. In continuous pipe welding apparatus of the type described, a strip heating furnace having a strip outlet opening, a rail member extending away from said furnace outlet, a frame structure supported on said rail member for sliding adjustment toward or away from said outlet, means for locking said frame in adjusted position on said rail member, a pair of forming rolls carried by said frame in horizontal alignment with said outlet, a motor mounted on said frame, driving connections from said motor to said forming rolls, and a pair of fixed blow pipes disposed adjacent said furnace outlet and adapted to discharge air against the opposite edges of the strip leaving said furnace before the strip enters said forming rolls.

2. In pipe welding apparatus of the type described, a strip heating furnace having a strip outlet opening, a rail member extending away from said furnace outlet, a frame structure supported on said rail member for sliding adjustment along the line of pipe travel toward or away from said outlet, means for locking said frame in adjusted position on said rail member, a pair of forming rolls carried by said frame in alignment with said outlet, means for driving said forming rolls, a second frame structure supported on said rail member for sliding adjustment along the line of pipe travel toward or away from said first named frame member, said second frame being disposed on the opposite side of said first frame from said furnace outlet, means for locking said second frame in adjusted position on said rail member, a pair of welding rolls carried by said second frame, and means for driving said welding rolls in predetermined relation to said forming rolls.

3. In pipe welding apparatus of the type described, a strip heating furnace having a strip outlet opening, a rail member extending away from said furnace outlet, a frame structure supported on said rail member for sliding adjustment along the line of pipe travel toward or away from said outlet, means for locking said frame in adjusted position on said rail member, a pair of forming rolls carried by said frame in alignment with said outlet, means for driving said forming rolls, a second frame structure supported on said rail member for sliding adjustment along the line of pipe travel toward or away from said first named frame member, said second frame being disposed on the opposite side of said first frame from said furnace outlet, means for locking said second frame in adjusted position on said rail member, a pair of welding rolls carried by said second frame, means for driving said welding rolls in predetermined relation to said forming rolls, and means, carried by said second frame and movable therewith and extending into the open seam of the pipe, for discharging a blast of air into the pipe between said forming and welding rolls.

WILLIAM RODDER.
JAMES H. HOPKINS.